July 3, 1928.  
H. WEINERT  
ARRANGEMENT OF 6N-POLE WINDINGS  
Filed July 9, 1926
1,676,123
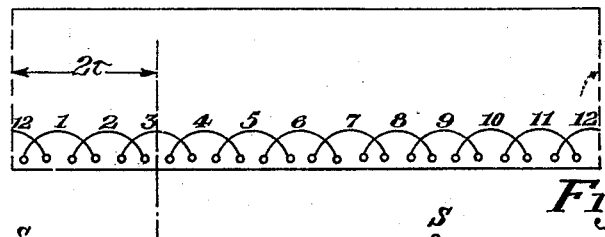
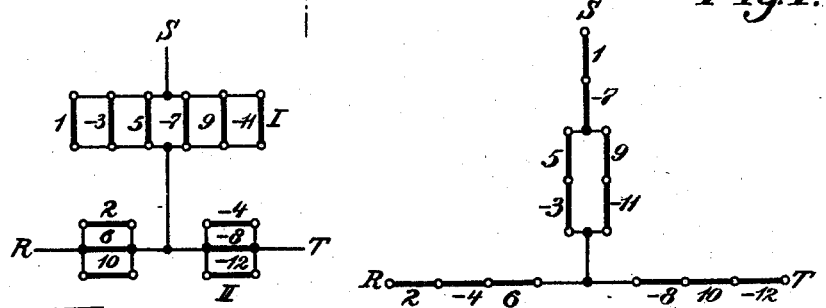
Fig.4.  Fig.5.
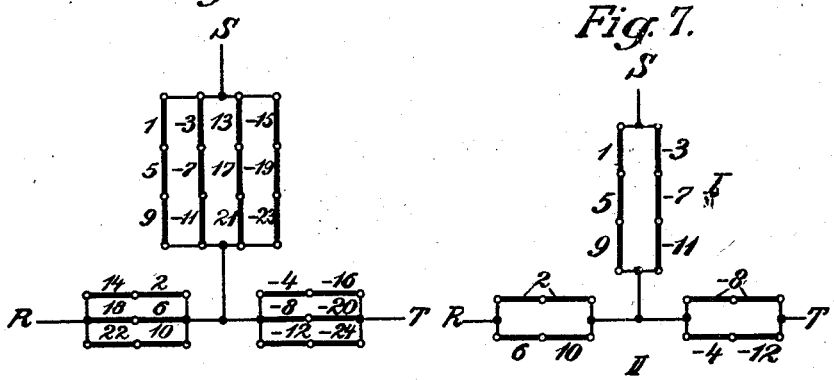
Fig.6.  Fig.7.
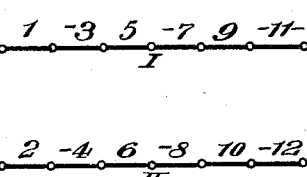
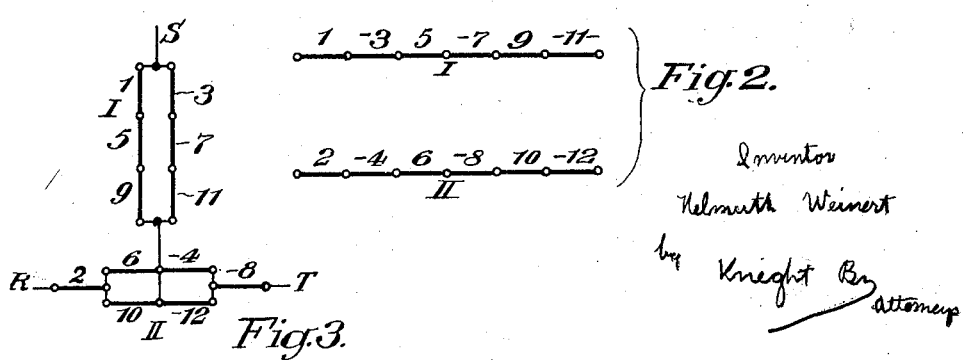
Fig.3.  Fig.2.
Inventor  
Helmuth Weinert  
by Knight  
attorney Patented July 3, 1928.

1,676,123

UNITED STATES PATENT OFFICE.

HELMUTH WEINERT, OF DRESDEN-KOTZSCHENBRODA, GERMANY, ASSIGNOR TO SIEMENS-SCHUCKERTWERKE GESELLSCHAFT MIT BESCHRANKTER HAFTUNG, OF SIEMENSSTADT, GERMANY, A CORPORATION OF GERMANY.

ARRANGEMENT OF 6N-POLE WINDINGS.

Application filed July 9, 1926, Serial No. 121,480, and in Germany February 2, 1925.

My invention relates to the arrangement of a $6n$-pole ($n$ being a whole number) primary winding in dynamo electric machines, and it relates in particular to $6n$-pole primary windings of induction motors. The winding is composed of the wnding elements of a standard $8n$-pole three phase winding. These winding elements are connected to each other in such manner that the spacially successive even winding elements constitute one phase and the uneven winding elements the second phase of a T-winding. The outer ends of the T-winding are connected to the mains of a three phase supply line.

The invention consists in the connection of the winding elements within the two phases of the T-winding in such manner in parallel or in series-parallel with each other, that the number of the series-connected elements in the vertical phase of the T-winding is smaller than the number of similarly connected elements in the horizontal phase. In this manner the effect is obtained that the T-connected winding draws currents from the three phases of the line which vary only slightly in value for all practical admissible purposes, notwithstanding the fact that the T-winding is a two phase winding which, accordingly, should really be connected to a two phase system and not, as according to the invention, to a three phase system.

The invention is illustrated in the accompanying drawings in which is assumed a 6-pole winding composed of the winding elements of a normal 8-pole three phase winding.

In these drawings:

Figure 1 represents diagrammatically an end view of the stator winding of an electric machine, developed into a straight line, and Figures 2 to 7 represent differently grouped connections of the several winding elements according to the present invention.

Referring to Figure 1, the stator is assumed to contain a winding, whose winding elements 1 to 12 completely correspond (and thus in particular also with respect to coil distance and spacial distribution over the armature circumference) with the twelve winding elements of a normal 8-pole three phase winding. Of these twelve winding elements there are grouped in the well known manner, and as shown in Figure 2, the odd numbered elements so as to constitute phase I whereas the even numbered elements are grouped together to constitute phase II of the two phase winding. Besides within these individual phases the winding elements 3, 7 and 11 in phase I and 4, 8 and 12 in phase II are connected in reverse direction (by crossing their ends), which is denoted in the drawings through a minus sign.

In Figures 3 to 7 a number of modifications are illustrated, showing how within the two phases of the T-connection the individual winding elements may be connected in such manner that the number of series-connected elements in the vertical phase is smaller than the number of similarly connected elements in the horizontal phase.

For example, in the $6n$-pole connection shown in Figure 3, the winding elements in vertical phase I form two parallel groups (1, 5, 9 and —3, —7, —11), and of the three winding elements in each of the two halves of the horizontal phase II two are connected in parallel and the third in series with the two parallel ones. For instance, in the right-hand portion of the phase II the winding elements —4 and —12 are connected in parallel relation to each other, and the element —8 is in series with this portion. It will be seen that here the ratio of the series-connected elements in the vertical phase to the series-connected elements in the horizontal phase equals 3:4 and is thus smaller than 1. As numerous experiments have shown the current intake from the three network connections, in particular, is practically uniform.

In the diagram of connections shown in Fig. 3, the individual elements of the windings within the phase may naturally be interchanged by changing, for instance the sequence of the series connection, without making thereby any change in the manner of operation of the motor. It is, however, advisable to select the location of the two winding elements (2 and —8 in Fig. 3) in the halves of the horizontal phase II in such a manner that these elements are removed from one another by the $3n$-times pole-pitch (number of poles $6n$).

It will be readily understood that other connections of the winding elements in the T-connection are possible in which the condition of the invention is fulfilled that the ratio of the turns connected in series in the vertical phase to similarly connected elements in the horizontal phase of the T-connection is less than 1. Fig. 4 of the drawings shows, for instance, a connection of a winding according to Fig. 1 for the pole number 6, in which the six elements of the winding in the vertical phase of the T-connection are all connected in parallel relation while in the horizontal phase three winding elements each are connected in parallel with one another and these two groups thus formed are connected in series. Fig. 5 illustrates a connection of the winding according to Fig. 1 for the pole number 6 in which in the vertical phase three groups of two series-connected elements each are formed, of which two groups are connected in parallel, the third group being in series with the two other groups. The six elements of the horizontal phase are all connected in series. Fig. 6 illustrates a connection in which the winding has twice as many poles as is assumed in the diagram according to Fig. 1, a normal 16-pole connection being thus changed over to a 12-pole connection according to my invention. The number of the possible connections according to my invention grows with the value of the factor $n$, from $n=1$ representing the lowest pole number 6 of the motor.

In my improved connection according to Fig. 3 of the drawing the two winding elements 2 and —8 in the horizontal phase II are comparatively heavily loaded since they are connected in series to the winding elements 6 and 10 or —4 and —11 connected respectively in parallel relation.

It is, furthermore, also possible to connect the three winding elements in each half of the horizontal phase of the diagram in Fig. 3 of the drawings in such a manner that the current load is uniform in all three parts. This may be attained by arranging the winding elements in the vertical phase I of the T-connection to form two parallel groups, each containing three elements in series, and on the other hand by arranging the three winding elements in each half of the horizontal phase II so that two are connected in series and the third is designed with a double number of turns and connected in parallel relation to the two series-connected elements of the half. Figure 7 of the drawings illustrates such an arrangement. The winding elements 6 and 10 in the left-hand half of the horizontal phase are here connected in series, the winding element 2 has in relation to the elements 6 and 10 double the number of turns and is connected in parallel with the two elements 6 and 10. The connection in the right-hand half of the horizontal phase is similar. In this connection the ratio of the series turns of the vertical phase to the turns of the horizontal phase is likewise less than 1, viz $\frac{3}{4}$. The subdivision of the current in the portions of the winding of the horizontal phase is now so, that, for instance, the portions 6 and 10 of the winding carry two thirds and the portion 2 of the winding one third of the current of the network.

Various modifications and changes may be made without departing from the spirit and the scope of the invention, and I desire, therefore, that only such limitations shall be placed thereon as are imposed by the prior art.

I claim as my invention:

1. In a dynamo electric machine connected to a three phase line, a primary winding on the machine containing the winding elements of an $8n$-pole three phase winding, said elements being connected so that the spacially successive even and odd numbered elements respectively form the horizontal and vertical phase of a $6n$-pole T-winding, said elements being connected with each other within the several phases of the T-winding such that the number of series-connected elements in the vertical phase is smaller than that of similarly connected elements in the horizontal phase, and connections between the outer ends of the T-winding and the three phase line.

2. In a dynamo electric machine connected to a three phase line, a primary winding on the machine containing the winding elements of an $8n$-pole three phase winding, said elements being connected so that the spacially successive even and odd numbered elements respectively form the horizontal and vertical phase of a $6n$-pole T-winding, said elements being connected in series-parallel with each other within the several phases of the T-winding such that the number of series-connected elements in the vertical phase is smaller than that of similarly connected elements in the horizontal phase, and connections between the outer ends of the T-winding and the three phase line.

3. In a dynamo electric machine connected to a three phase line, a primary winding on the machine containing the winding elements of an $8n$-pole three phase winding, said elements being connected so that the spacially successive even and odd numbered elements respectively form the horizontal and vertical phase of a $6n$-pole T-winding, the winding elements in the vertical phase comprising two parallel-connected groups of series-connected elements, the winding elements in the horizontal phase comprising two parallel connected element groups, of which one group contains in series-connection two thirds of the number of elements contained in the horizontal phase, and the other group contains in series-connection one third of that number of elements, the elements of the smaller group having twice as many windings in series than the elements in the larger group, and connections between the outer ends of the T-winding and the three phase line.

In testimony whereof I affix my signature.
HELMUTH WEINERT.